(12) United States Patent
Martín Hernández

(10) Patent No.: US 7,800,884 B2
(45) Date of Patent: Sep. 21, 2010

(54) PROTECTIVE DEVICE AGAINST ELECTRICAL DISCHARGES IN FIXING ELEMENTS

(75) Inventor: Agustín Mariano Martín Hernández, Madrid (ES)

(73) Assignee: Airbus Espana, S.L., Madrid (ES)

( * ) Notice: Subject to any disclaimer, the term of this patent is extended or adjusted under 35 U.S.C. 154(b) by 456 days.

(21) Appl. No.: 12/008,987

(22) Filed: Jan. 15, 2008

(65) Prior Publication Data

US 2009/0126973 A1    May 21, 2009

(30) Foreign Application Priority Data

Nov. 15, 2007    (ES) ................................ 200703021

(51) Int. Cl.
*H05F 3/00* (2006.01)
(52) U.S. Cl. ...................................... 361/218
(58) Field of Classification Search ................. 361/218
See application file for complete search history.

(56) References Cited

U.S. PATENT DOCUMENTS 3,494,243 A * 2/1970 Kleinhenn ................... 411/403
4,630,168 A * 12/1986 Hunt ........................... 361/218
4,755,904 A * 7/1988 Brick ......................... 361/117

* cited by examiner

*Primary Examiner*—Ronald W Leja
(74) *Attorney, Agent, or Firm*—Ladas and Parry LLP

(57) ABSTRACT

The invention relates to a device (1) for the protection against electrical discharges of a conductive fixing element (4) of an aircraft, comprising a cap (2) made of non-conductive material and a washer (3) made of non-conductive material insulating the fixing element (4) from electrical discharges, said cap being an open receptacle with a cylindrical shape closed at one of its ends and open at the other end, comprising at the lower part of its inner face a thread (15), the washer (3) being retained by the fixing element (4), said washer (3) having a thread (5) on its outer face coupling with the complementary thread (15) in the lower area of the inner face of the cap (2), relative movements between the washer (3) and the cap (2) being prevented.

9 Claims, 2 Drawing Sheets

PROTECTIVE DEVICE AGAINST ELECTRICAL DISCHARGES IN FIXING ELEMENTS

FIELD OF THE INVENTION

The present invention relates to a device for the protection against electrical discharges in conductive fixing elements, particularly for aircraft.

BACKGROUND OF THE INVENTION

In certain mechanical or structural applications it is necessary to effectively prevent the possibility of a spark being generated between two conductive fixing elements, or between a fixing element and another conductive element, which are at a different electric potential. These different electric potentials can be caused by the presence of an electric current, by electric impacts such as lightning or an atmospheric discharge, by a static charge due to friction, etc.

In some applications, preventing these discharges can be a safety requirement, such as for example in the fixings in border areas or of areas inside the fuel storage tanks of aircraft.

There are several known processes for preventing these discharges from occurring between fixing elements:
- arranging the fixing elements with one another or the fixing element and the other conductive component at a distance that is suitable and sufficient to prevent discharges;
- electrically connecting the fixing elements to one another or the fixing element and the other conductive component such that they reach the same electric potential;
- arranging an insulating barrier between the fixing elements or between the fixing element and the other conductive component.

The first known solution has the problem of not being able to be used in those cases in which there is an important space limitation, therefore the fixing elements or the fixing element and the other conductive component cannot be sufficiently separated.

The second solution used in the state of the art has the drawback of the need for additional components which must be specifically designed according to the necessary fixing, which involves higher costs and the need to use non-standard components.

There are known solutions for providing an insulating barrier between the fixing elements or between the fixing element and the other conductive component, such as for example arranging a protective surface seal or paint in the previous elements. This method can be effective when the paint or seal layer has dielectric properties, but said layer or paint is subject to wear and aging, therefore it loses its insulation properties.

Another known solution consists of arranging an additional dielectric component, a glass fiber angle bar for example, between two fixing elements and another conductive component. This method is effective but requires specific designs for complex applications, an additional problem arising when the distance between the elements is small and there is not enough space to arrange this additional dielectric component.

Another known solution consists of arranging a dielectric cover or cap in at least one of the fixing elements. All the known solutions using this system install the mentioned dielectric cover or cap by pressure on the fixing element, which has the drawback that the cover or cap is damaged on numerous occasions during the installation, while at the same time the mentioned cap or cover can be lost when it is subjected to vibrations, which is very common in the operation of aircraft.

The present invention is aimed at solving these drawbacks.

SUMMARY OF THE INVENTION

The present invention proposes a device for the protection against electrical discharges of fixing elements between one another or of a fixing element and another conductive element, particularly for aircraft. The device of the invention thus comprises a cap and a washer, both of them manufactured in a non-conductive insulating material. The cap is arranged on the washer, whereas the mentioned washer is retained by the fixing element which is to be protected, such that the fixing element, once the device of the invention has been installed, is surrounded in every direction by a non-conductive insulating material, the generation of a discharge in the fixing element in question thus not being possible.

Other features and advantages of the present invention will be inferred from the following detailed description of an illustrative embodiment of its object in relation to the attached figures.

DETAILED DESCRIPTION OF THE INVENTION

Figure 1:
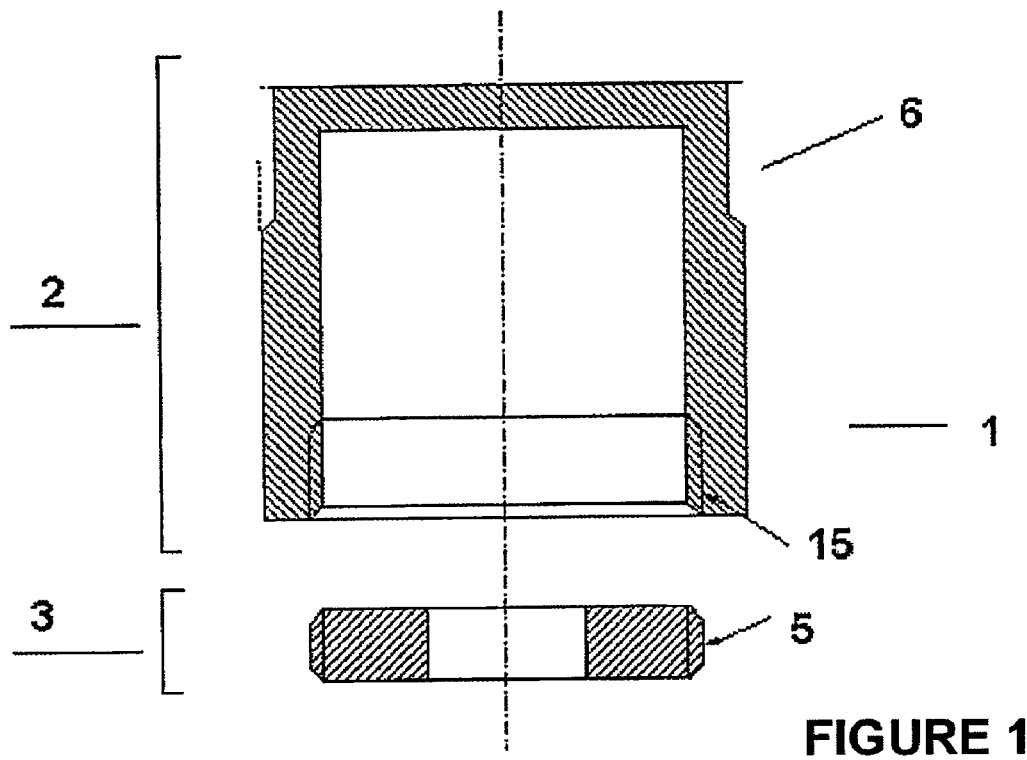
FIG. 1 shows a sectional view of the device for the protection against electric discharges according to the invention.

The present invention thus proposes a device 1 for the protection against electrical discharges of conductive fixing elements 4 between one another or of a fixing element and another conductive element (not shown). The device 1 according to the invention comprises a cap 2 and a washer 3, both of them made of non-conductive insulating material, preferably a dielectric material.

The washer 3 is placed under the fixing element 4, being in turn retained by said element 4, which element further prevents the movements of the mentioned washer 3. The washer 3 has a round shape and is thicker than conventional washers. The washer 3 is preferably manufactured from a dielectric material, such as nylon or a high-strength plastic, and comprises a thread 5 on its outer face The cap 2 is an open receptacle, with a preferably cylindrical shape, closed at one of its ends and with an opening at the other end, the shape and dimensions of which coincide with those of the outer face of the washer 3. The lower part of the inner face of the cap 2 comprises a thread 15 which is complemented with the thread 5 of the washer 3 and is used to fix the cap 2 to the washer 3 during the installation of the protective device 1.

The thread 5, 15 has automatic locking properties, which prevents the cap 2 from being loosened and separated from the washer 3.

According to a preferred embodiment of the invention, the cap 2 comprises a recess 6 at the upper part of its outer face to facilitate the installation of the mentioned cap 2 with conventional tools during the application of the installation tightening torque. The cap 2 is preferably manufactured from a dielectric material, such as nylon or a high-strength plastic.

Once the device 1 with its two components, cap 2 and washer 3, are installed together with a fixing element 4, said fixing element 4 is surrounded in every direction by a non-conductive material, preferably a dielectric material, such that the generation of an electrical discharge in the mentioned fixing element 4 is not possible.

Figure 2:
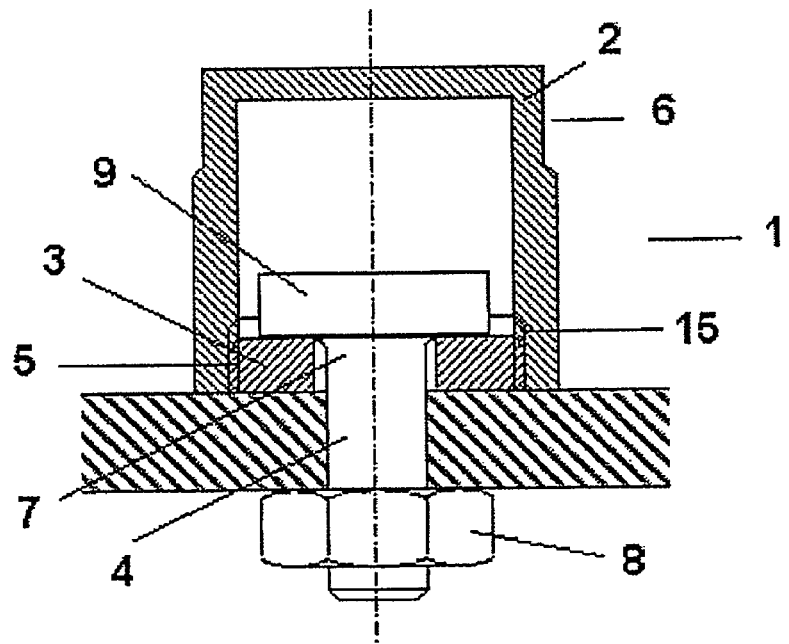
FIG. 2 shows a sectional view of the device for the protection against electric discharges according to the invention arranged on a standard conductive fixing screw.

FIG. 2 shows an installation example of the protective device 1 in the particular case in which the fixing element 4 comprises a standard screw 7 with a standard nut 8, the cap 2 of the device 1 being arranged in the area of the head 9 of the screw 7.

Figure 3:
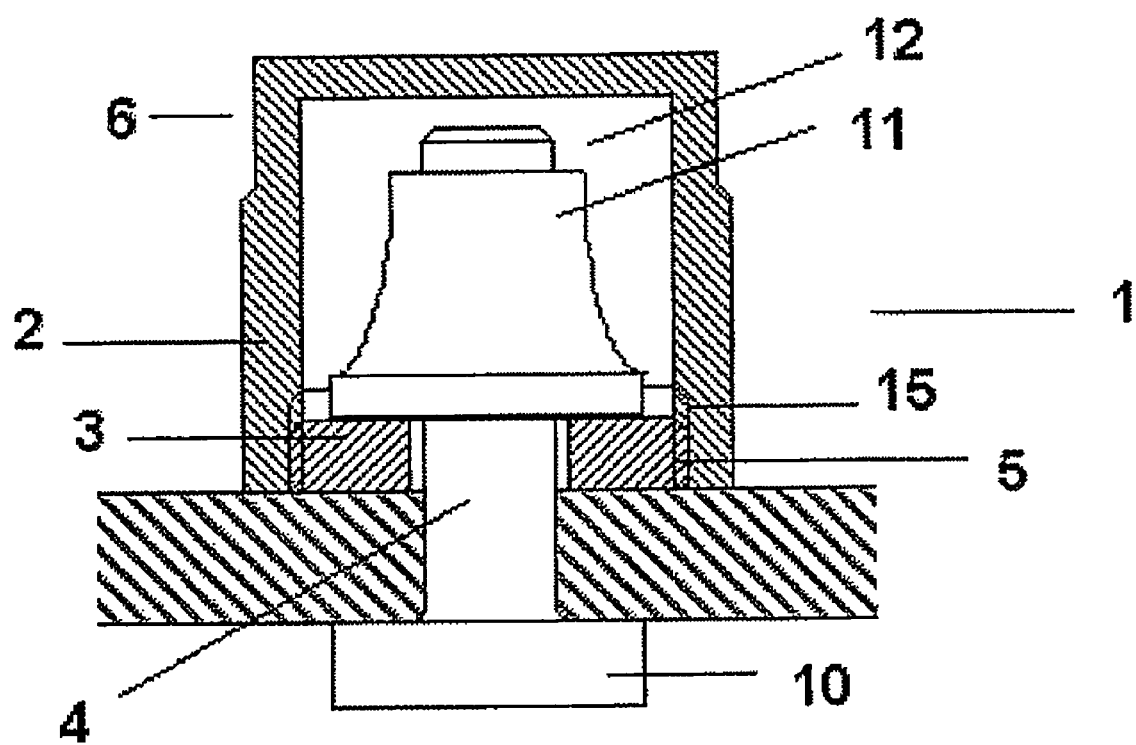
FIG. 3 shows a sectional view of the device for the protection against electric discharges arranged on a standard conductive rivet.

FIG. 3 shows an installation example of the protective device 1 in the particular case in which the fixing element 4 comprises a rivet 10 and a bushing 11, the cap 2 of the device 1 being arranged in the area of the bushing 11.

In the event of protecting two fixing elements 4 from electric discharges between one another, a device 1 with its cap 2 and its washer 3 would be arranged in at least one of the fixing elements 4 to be protected. In the event that a fixing element 4 and another conductive element (not shown) are to be protected from electrical discharges, the mentioned device 1 (with cap 2 and washer 3) would be arranged on the fixing element 4.

The modifications comprised within the scope defined by the following claims can be introduced in the preferred embodiments which have just been described.

The invention claimed is:

1. A device (1) for the protection against electrical discharges of a conductive fixing element (4) of an aircraft characterized in that the device (1) comprises a cap (2) made of non-conductive material and a washer (3) made of non-conductive material insulating the fixing element (4) from electrical discharges, the washer (3) being retained by the fixing element (4), said washer (3) having a thread (5) on its outer face coupling with a complementary thread (15) in the lower area of the inner face of the cap (2), relative movements between the washer (3) and the cap (2) being prevented.

2. A device (1) for the protection against electrical discharges of a conductive fixing element (4) of an aircraft according to claim 1, characterized in that the thread (5, 15) has automatic locking properties, to thus prevent the cap (2) and the washer (3) from being separated during the operation of the aircraft.

3. A device (1) for the protection against electrical discharges of a conductive fixing element (4) of an aircraft according to claim 1, characterized in that the cap (2) comprises a recess (6) at the upper part of its outer face for facilitating the installation of the mentioned cap (2) with conventional tools during the application of the installation tightening torque.

4. A device (1) for the protection against electrical discharges of a conductive fixing element (4) of an aircraft according to claim 1, characterized in that the cap (2) is made of dielectric material.

5. A device (1) for the protection against electrical discharges of a conductive fixing element (4) of an aircraft according to claim 4, characterized in that the cap (2) is made of nylon.

6. A device (1) for the protection against electrical discharges of a conductive fixing element (4) of an aircraft according to claim 4, characterized in that the cap (2) is made of high-strength plastic.

7. A device (1) for the protection against electrical discharges of a conductive fixing element (4) of an aircraft according to claim 1, characterized in that the washer (3) is made of dielectric material.

8. A device (1) for the protection against electrical discharges of a conductive fixing element (4) of an aircraft according to claim 7, characterized in that the washer (3) is made of nylon.

9. A device (1) for the protection against electrical discharges of a conductive fixing element (4) of an aircraft according to claim 7, characterized in that the washer (3) is made of high-strength plastic.

* * * * *